United States Patent [19]

Stepner

[11] Patent Number: 5,347,913
[45] Date of Patent: Sep. 20, 1994

[54] PORTABLE BICYCLE PUMP HAVING COLLAPSIBLE HANDLE AND FOOTSTAND

[76] Inventor: David E. Stepner, 12553 Parker Ranch Ct., Saratoga, Calif. 95070

[21] Appl. No.: 110,581
[22] Filed: Aug. 23, 1993
[51] Int. Cl.⁵ .......................................... F03B 39/12
[52] U.S. Cl. ........................... 92/58.1; 417/234; 280/288.4
[58] Field of Search .................. 417/234, 313, 236; 92/58.1; 280/288.4, 201, 304.5; D23/231

[56] References Cited

U.S. PATENT DOCUMENTS

| D. 168,658 | 1/1953 | Russell | D23/231 |
|---|---|---|---|
| D. 323,876 | 2/1992 | Furusawa | D23/231 |
| 575,430 | 1/1897 | Savoie . | |
| 639,552 | 12/1899 | Gabel . | |
| 643,429 | 2/1900 | Wade . | |
| 643,806 | 2/1900 | Allen | 280/201 |
| 785,154 | 3/1905 | Cordeau | 92/58.1 |
| 1,163,429 | 12/1915 | Magin | 280/288.4 |
| 1,447,669 | 3/1923 | Landin | 92/58.1 |
| 2,436,083 | 1/1948 | Peters et al. | 92/58.1 |
| 2,462,980 | 3/1949 | Litt | 92/58.1 |
| 2,557,139 | 6/1951 | Peters et al. | D23/231 |
| 3,819,302 | 6/1974 | Ohashi . | |
| 4,185,670 | 1/1980 | Sartell . | |
| 4,712,592 | 12/1987 | Brown | 141/98 |
| 4,773,454 | 9/1988 | Kroh . | |
| 4,842,290 | 6/1989 | Alioto . | |
| 5,180,283 | 1/1993 | Vickery . | |

FOREIGN PATENT DOCUMENTS

| 188608 | 3/1956 | Austria | 280/201 |
|---|---|---|---|
| 63929 | 9/1945 | Denmark | 417/313 |
| 387672 | 1/1924 | Fed. Rep. of Germany | 92/58.1 |
| 1161823 | 11/1956 | France | 417/313 |
| 72815 | 11/1947 | Norway | 280/201 |
| 236906 | 7/1945 | Switzerland | 92/58.1 |
| 776191 | 6/1957 | United Kingdom | 280/201 |
| 2150228 | 6/1985 | United Kingdom | 417/234 |

OTHER PUBLICATIONS

Blackburn & Zefal Pumps (shown on page 26 of the 1992 Fall Catalog of Colorado Cyclist).

Primary Examiner—Richard A. Bertsch
Assistant Examiner—Roland G. McAndrews, Jr.
Attorney, Agent, or Firm—David Goren

[57] ABSTRACT

A bicycle pump which has a pivoting footpeg on which the user may stand to secure the pump against the ground. The pump has a pivoting handle which includes a spring which forces apart the base and handle of the pump so that the pump can be secured in tension on a bicycle frame.

16 Claims, 8 Drawing Sheets

PORTABLE BICYCLE PUMP HAVING COLLAPSIBLE HANDLE AND FOOTSTAND

FIELD OF INVENTION

The present invention relates to manually operated pumps for the inflation of bicycle tires. More specifically, the invention pertains to a bicycle pump which can be secured by foot against the ground and can be attached to a bicycle frame.

BACKGROUND OF INVENTION

Manually operated air pumps for the inflation of bicycle tires are known in the art. By "pump" is meant a device which causes fluid flow, and which usually compresses a gaseous fluid and delivers it under pressure to an enclosed space. By "air" is meant any gas, preferably ambient atmosphere. Typically, hand operated pumps are one stage pumps in which air is drawn into the pump and trapped when the user pulls a handle up and discharged when the handle is depressed. For example, U.S. Pat. No. 639,552, issued in 1899, discloses a pump having a handle. By depressing the handle, the trapped air is compressed and forced into the enclosed space. A one-way valve is often employed to prevent exit of the compressed air. Some new hand operated pumps are double action pumps which generate compression on both up and down strokes.

Serious cyclists carry hand-operated air pumps for inflation of bicycle tires. The pumps must be compact, portable, and light weight. Preferably such pumps can be attached to the frame of the bicycle or are small enough to store in a pack. Unfortunately, as will be shown, presently available pumps are cumbersome and difficult to utilize.

One variety of commercially available pump is the floor pump. An example of the floor pump is the BLACKBURN TP-2 TrackPump TM. The user of a floor pump takes the hose and attaches it to the bike, steps on the footpeg to provide stability, and pumps the handle, up and down. The footpeg allows the user to hold the pump in place during the up stroke. The problem with the floor pump is that it cannot be carried on a bicycle trip because it is heavy, bulky, and improperly shaped to attach to the bicycle frame or store in a pack. Thus the floor pump usually remains in the cyclist's garage and is not taken on bicycle trips.

Another commercially available pump is the tube pump. An example of the tube pump is the ZEFAL Mountain Plus TM. The tube pump is easy to attach to a bicycle frame, and the tubular shape is aerodynamic so as to reduce drag. While it can be carried on the bicycle, there are numerous drawbacks of the tube pump. The tube pump lacks a hose, therefore the tube pump nozzle must be held in place against the tire valve and cannot be rested on the ground for stability. Even if placed on the ground, the tube pump would lack a footpeg. In addition, instead of a handle that is perpendicular to the tube, the pump handle is a portion of the tube. In sum, due to the construction of the tube pump, first it is difficult to keep in place against the tire and second the pump wastes effort as the user must hold the pump in place with one arm against the force applied by the other arm to depress the handle.

The earliest air pumps are illustrated by U.S. Pat. Nos. 575,430; 639,552; 643,429; and 643,806. All of these pump designs suffer from one or more of the problems afflicting the ZEFAL and BLACKBURN pumps; either they are bulky and cannot be attached to the frame, or they can't be stabilized against the ground.

Another pump, as described in U.S. Pat. Nos. 4,712,592 and 4,842,290, stores the cylinder of the pump in the frame as part of the post for the seat. This pump is not useful because the seat is bulky and inconvenient to use as a handle for the pump. In addition, it is difficult and time consuming to disassemble the bike to use the pump.

Yet another type of air pump for bicycle tires, described in U.S. Pat. No. 5,180,283, utilizes a rotating flywheel and pull-strap. The disadvantages of this pump are a complicated pump structure, and the preference of cyclists for the traditional pump with a handle.

Still another type of pump, as described in U.S. Pat. Nos. 4,185,670 and 4,773,454, utilizes a tank of compressed air to provide the pressure to inflate the bicycle tire. The disadvantages of such a pump include the expense of additional compressed air cylinders, the space these cylinders require in a pack, and the possibility that the cyclist will run out or forget to pack the cylinders.

As can be seen from the preceding discussion, what is needed is an ordinary hand-operated bicycle tire pump which is light and easy to carry and attach to a bicycle frame, yet has the advantages of a floor pump which can anchored against the ground with a footpeg the handle is pulled and stabilized against the ground when the handle is pushed.

OBJECTS OF THE INVENTION

A general object of the present invention is to provide a hand operated air pump which overcomes the drawbacks of the prior art.

An object of the present invention is to provide a compact, light-weight hand operated pump which can be attached to the frame of a bicycle.

Another object of the present invention is to provide a pump having an aerodynamic shape when attached to the bicycle frame.

One more object of the present invention is to provide a handle for a pump which can fold to give greater compact size, aerodynamic shape, and ease for attachment to the bicycle frame.

A further object of the present invention is to provide a handle mechanism for a one or two-stage pump activated by pushing and pulling action.

Yet another object of the present invention is to provide a pump having a footpeg to secure the pump against the ground during the pushing and pulling action on the handle.

Still another object of the present invention is to provide a footpeg for a pump which can fold to give compact size, aerodynamic shape, and ease of attachment to the bicycle frame.

Still one more object of the present invention is to provide a pump having a hose to attach to the bicycle tire.

SUMMARY OF THE INVENTION

In accordance with the principles of the invention, there is provided a manually operated bicycle pump comprising a main body including a barrel and a base, the barrel having a top and a bottom, the base connected to the bottom of the barrel, a shaft having a top and a bottom, the bottom of the shaft inserted into the top of the barrel, a handle attached to the top of the shaft, a hose connected to the base, a means for forcing air through the hose as the shaft slides in the barrel, means for securing the pump in a stable position against the ground as a user moves the handle, and means for attaching the pump to a frame of a bicycle.

BRIEF DESCRIPTION OF DRAWINGS

The above and other objects, features and advantages of the present invention will become more readily apparent from the following description, reference being made to the accompanying drawings in which similar elements are similarly numbered.

DETAILED DESCRIPTION OF INVENTION

Figure 1A:
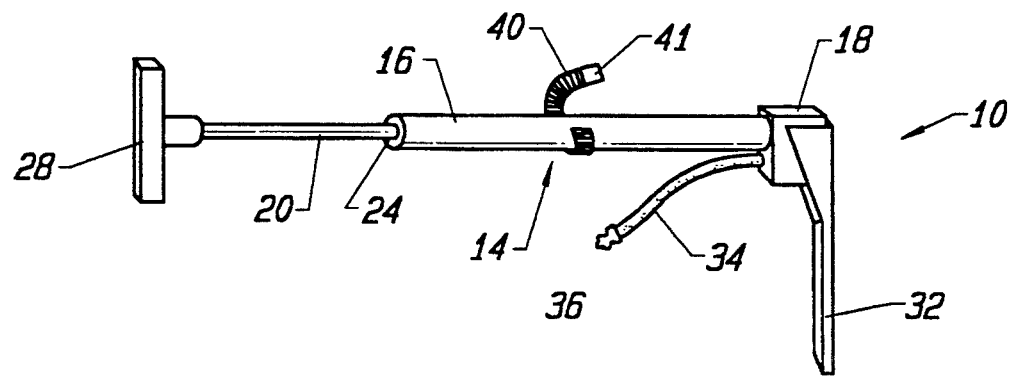
FIG. 1A is a perspective view of the main elements of the pump of the present invention in an unfolded state.
Figure 2A:
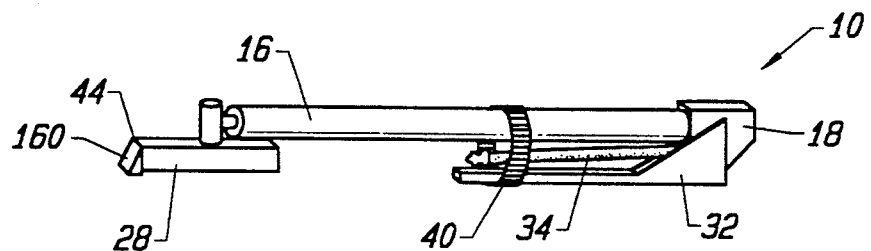
FIG. 2A is a perspective view of the main elements of the pump of the present invention in a folded state.

FIGS. 1A and 2A illustrate a manually operated air pump 10 of the present invention. Pump 10 has a main body 14 including a barrel 16 and a base 18. Attached to one end of the long cylindrical barrel 16 is a base 18. Into the other end of barrel 16 one end of shaft 20 is inserted. The gap between the shaft 20 and barrel 16 is sealed by seal 24. Seal 24 can be an O-ring seal. The shaft 20 and barrel 16 are preferably made of machined aluminum. Barrel 16 and shaft 20 may also be composed of steel or another material strong enough to withstand high pressures. Barrel 16 is typically 18 to 24 inches long, and about 1 inch in diameter.

Main body 14 includes the various internal pump mechanisms to compress air. The compression mechanism may be any standard pump mechanism. As the internal mechanisms of main body 14 do not appreciably differ from the prior art, they will not be described in detail. In brief, the barrel 16 will include a chamber (not shown), and as shaft 20 is pushed into the barrel 16, the air inside the chamber will be compressed and forced through a valve in base 18.

Figure 1B:
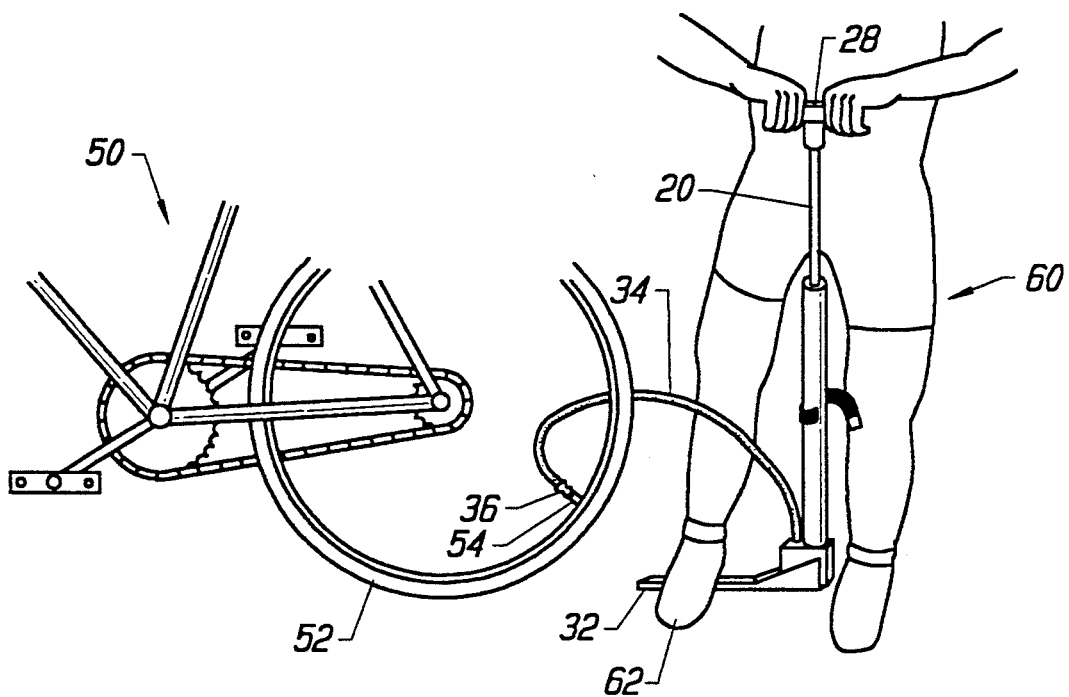
FIG. 1B shows the application of the pump for inflation of bicycle tires.

Connected to the other end of shaft 20 is flexible handle 28. In the preferred embodiment, handle 28 is pivotally attached to shaft 20 and includes a sliding and locking mechanism, as shown in FIGS. 4-5. Connected to the base 16 is footpeg 32. In the preferred embodiment, footpeg 32 is pivotally attached to the base 16. Handle 28 and footpeg 32 may be made of plastic or metal, but they are preferably made of a sturdy lightweight material such as polycarbonite. As shown in FIG. 1B, handle 28 should be shaped so that it can be grasped by two hands, and footpeg 32 should be shaped to be held secure by one foot. It is preferred for the handle 28 to be about six inches long. Optionally located between the handle 28 and barrel 16 is a cushion (not shown). The cushion may be a rubber O-ring fitted around shaft 20. In the preferred embodiment, the cushion is absent.

Also connected to base 16 is flexible plastic hose 34. Hose 34 will receive the compressed air from the chamber in main body 14. Hose 34 should be at least six inches in length, but not more than the length of the barrel. At the end on flexible hose 34 is a nozzle 36. Nozzle 36 is preferably composed of brass, and is designed to fit various bicycle tire valves such as either Shrader or Presta.

Attached the pump, preferably on the barrel 16, is a wrapping means to hold the footpeg 32 close to the barrel 16. The wrapping means may be, for example, a strap 40 several inches long with a VELCRO ™ patch 41.

Pump 10 can be manipulated between a first open configuration and a second collapsed configuration, as will be explained below. With reference to FIG. 1A, pump 10 is shown in an open configuration suitable for use when inflating tires. In the open configuration, the handle 28 is positioned perpendicular to the shaft 20 and shaft 20 is partially extended out of barrel 16. Footpeg 32 is also perpendicular to barrel 16, and hose 34 is free to be manipulated and attached to a bicycle tire.

Turning now to FIG. 1B, the operation of pump 10 in the open configuration will be explained. In FIG. 1B the pump 10 is shown being used to inflate tire 52 of bicycle 50. Nozzle 36 of hose 34 is attached to air inlet fitting (valve) 54 of tire 52. Grasping handle 28, the user 60 pumps the shaft 20 up and down. The user 60 stands with one foot 62 on footpeg 32 to secure the pump 10 in a stable position against the ground. Since the pump 10 is resting on the ground, the pump 10 is easy to hold stable and the user 60 is pressing against the ground when the handle 28 is being pushed. Similarly, when the user 60 is pulling handle 28, the stress is against the user's foot 62. User's foot 62 provides counter pressure when the handle 28 is being lifted. The user 60 is able to put his or her full effort into the up-stroke and down-stroke. In this way, the user 60 is able to inflate the tire 52 with simple push-pull motion, and does not expend unnecessary energy in holding the pump in place against the tire 52 as is required in prior art portable pumps.

With reference to FIG. 2A, pump 10 is shown in a collapsed configuration suitable for use when carried on the bicycle frame. In the collapsed configuration, handle 28 has been rotated to be parallel to the barrel 16 and the shaft 20 is entirely inside barrel 16. Footpeg 32 is also rotated to be parallel to barrel 16, and hose 36 is trapped between the footpeg 32 and barrel 16 and is immobilized. In addition, handle 28 and footpeg 32 are located on the same side of the barrel 16. Strap 40 is wrapped around barrel 16, hose 34, and footpeg 32, and is secured in place to hold hose 34 and footpeg 32 against barrel 16 by VELCRO patch 41.

Figure 2B:
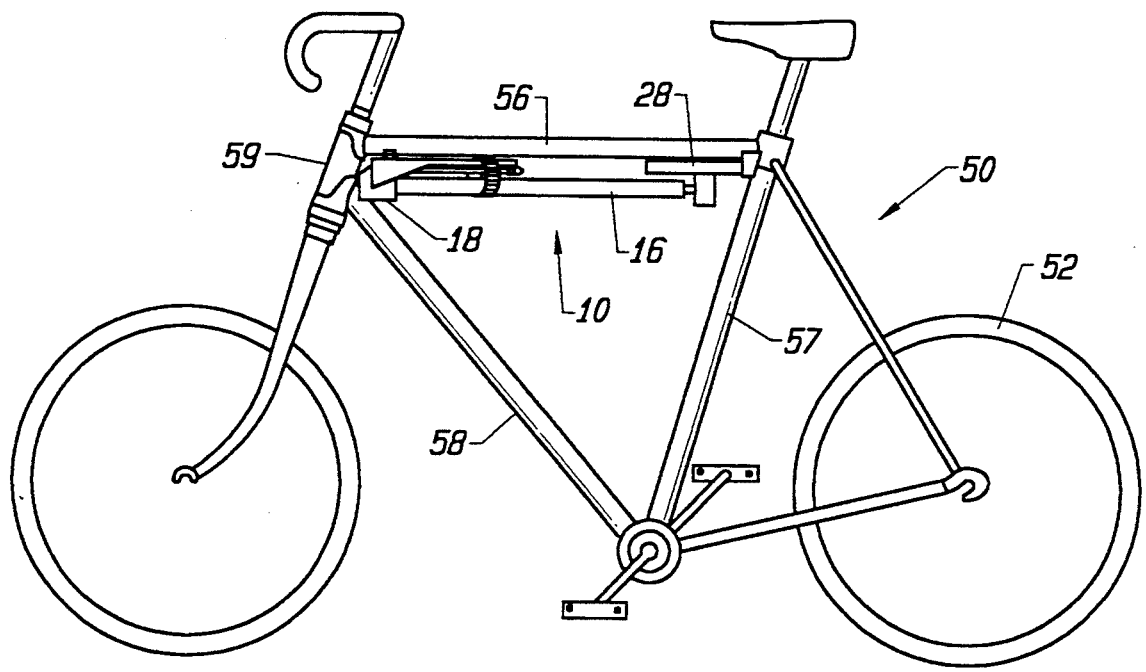
FIG. 2B shows the application of the pump to be carried on a bicycle frame.

Turning now to FIG. 2B, the operation of pump 10 in the collapsed configuration will be explained. In the preferred embodiment, pump 10 is fit onto frame 50 and rests underneath top tube 56. One end of handle 28 fits against seat tube 57, and the base 18 fits against down tube 58. The pump includes some means for forcing the ends of the pump apart. In the preferred embodiment, as will be explained in conjunction with FIGS. 4-6 the handle 28 includes a spring which forces end 44 of the handle away from the barrel 16. In this way the pump is placed in a compression tension against tubes 57 and 58 of the frame and is thereby held firmly in place. Alternate embodiments will occur to those skilled in the art, in which pump has different fittings. For example, the position of the pump 10 might be reversed so that handle 28 fits against the head tube 59 and the base 18 fits against seat tube 57. As another example, the entire pump 10 might rest on top of down tube 58. Furthermore, in alternate embodiments means other than a spring may be used to create a compression tension between the two ends of pump 10. For example, the pump 10 might include a screw mechanism or ratchet mechanism which would force the end 44 of the handle away from barrel 16 when twisted or ratcheted. All such embodiments are intended to be included in the concept of a pump held in compression tension on bicycle frame 50.

Figure 3A:
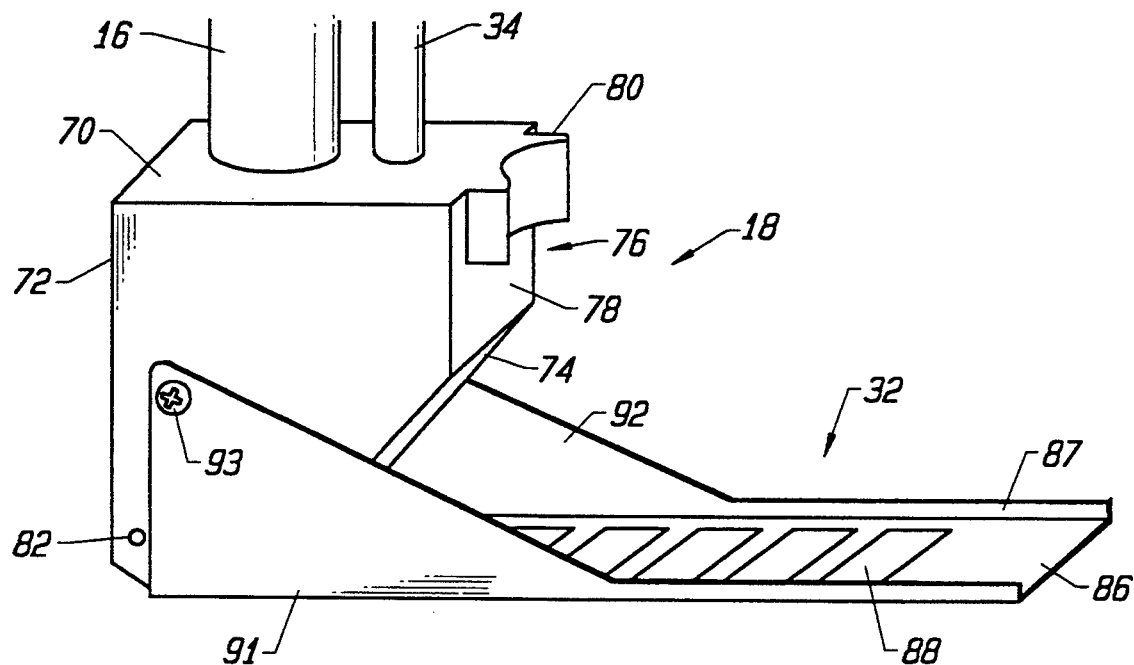
FIG. 3A is perspective view of the base and footpeg of the pump when unfolded for inflation of tires.
Figure 3B:
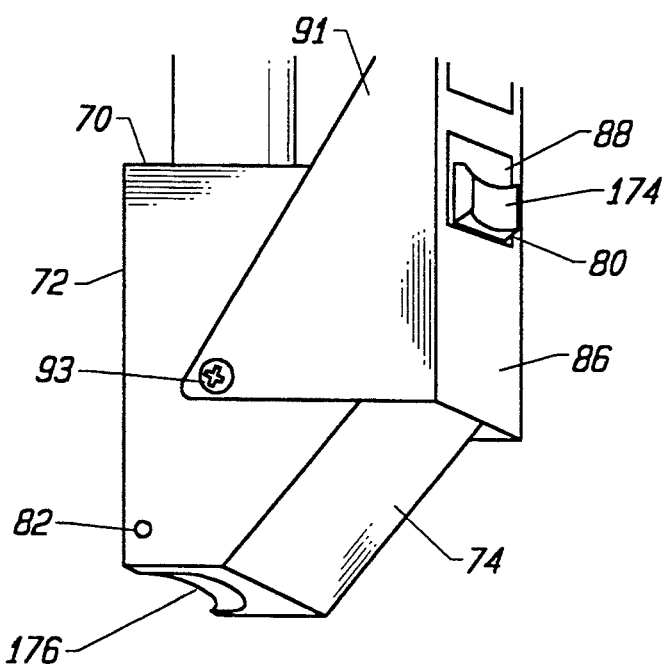
FIG. 3B is a perspective view of the base and footpeg of the pump when folded for carrying on the bicycle frame.

Referring now to FIGS. 3A and 3B, the detailed construction of the base 18 and footpeg 32 will be discussed. The base 18 is roughly wedge-shaped with a top 70, a long side 72, a sloped portion 74, and a short side 78. Out of the top 70 of the base 18 protrude the barrel 16 and flexible hose 36. The short side 76 includes a smooth surface 76 and a raised block 80. From both sides of base 18, in the lower corner nearer the long side 72, bumps 82 protrude from the surface. By chopping off the base 18 along a diagonal, excess metal may be eliminated to reduce the total weight of the pump 10. To further reduce the weight of the pump 10, the edges of the base may be rounded, and a hole may be punched through the base 18.

Footpeg 32 is a flat strut 86, which is generally flat but may have raised sides 87. The width of the strut 86 is slightly more than the width of the base 18. The strut 86 is preferably about 4-10 inches long; most preferred is for strut 86 to be about eight inches long. Footpeg 32 includes a plurality of rectangular or square holes 88 cut out of the flat strut 86 in order to reduce the total weight of pump 10. Two parallel triangular plates 90, 91 protrude from opposite sides at one end of the strut 86. Triangular plates 90, 91, of footpeg 32, which fit snugly around the sides of base 18, are pivotally attached to the base 18 by screws 93. As shown in FIG. 3A, in the open configuration, the strut 86 of footpeg 32 is perpendicular to barrel 18, and the parallel triangular plates 91, 92 rest against the bumps 82 to prevent the footpeg 32 from achieving greater than a right angle or pivoting through more than ninety degrees. As shown in FIG. 3B, in the collapsed configuration, the strut 86 rests smooth surface 78 of short side 76 while raised block 80 fits through one of the holes 88. Naturally other forms and shapes of the base 18 and footpeg 32 may occur to those skilled in the art. For example, footpeg 32 may have multiple joints to fold to a small size. All such embodiments are intended to be included in the concept of a footpeg which collapses from a configuration in which the footpeg 32 can be used to secure the pump 10.

Figure 4A:
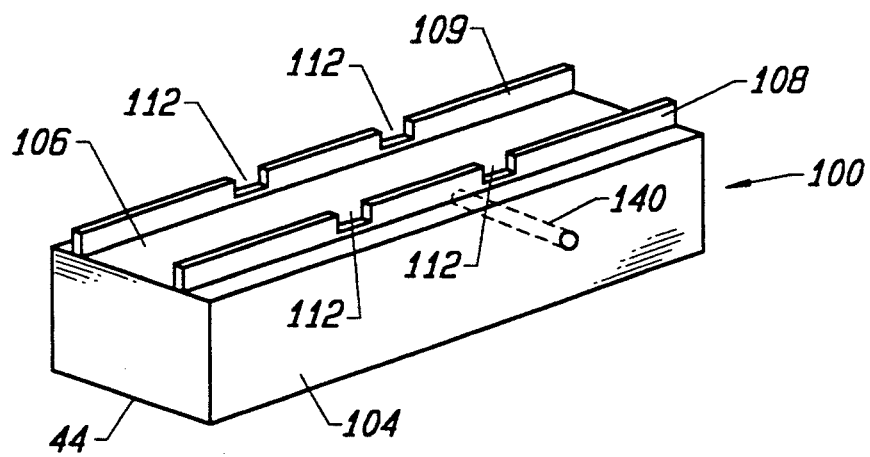
FIG. 4A is a perspective view of the grip in the handle.

The construction of the flexible handle with sliding and locking mechanisms is explained in conjunction with FIGS. 4 and 5. The largest piece of the handle is grip 100. FIG. 4A is a bottom perspective view of grip 100 with a partial cross-section. Grip 100 is generally rectangular, approximately 6 inches long, 1 inch wide, and ¾ inch deep. Grip 100 nearly encloses a rectangular cavity 104. Running lengthwise along the bottom of grip 100 is slot 106 which gives access to rectangular cavity 104. Projecting up from bottom of grip 100 and running along the opposite sides of slot 106, are raised inner walls 108, 109, each approximately 2 mm high. The sides of grip 100 may be slightly rounded to provide a more comfortable fit the hand.

Near the center of grip 100, cut into raised inner walls 108, 109 are four notches 112, two in wall 108 and two in wall 109. From slot 106, each notch 112 is cut through the raised wall 108 or 109 at an angle so that the notch 112 is perpendicular to the center of grip 100. The notches 108 are about 2 mm wide.

Figure 4B:
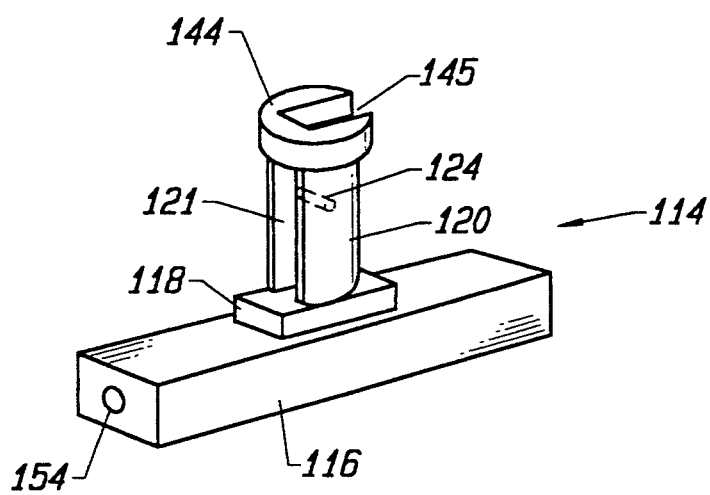
FIG. 4B is a perspective view of the sliding mechanism in the handle.

Turning now to FIG. 4B, a second piece of the handle for the sliding mechanism is shown in perspective. Sliding member 114 includes a rectangular body 116 which is less lengthy than the cavity 104 of grip 100. Attached to rectangular body 116 is elevated portion 118, and projecting down from elevated portion 118 are two parallel walls 120, 121. The two parallel walls 120, 121 have a rounded outer surface. Connecting the walls 120, 121 is axle bar 124.

Figure 5A:
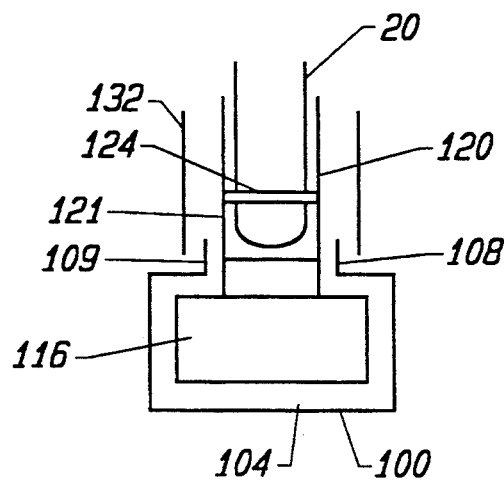
FIG. 5A is a frontal cross-sectional view of the pump handle showing how the grip, sliding and locking mechanisms, of the handle, and the shaft fit together.
Figure 5B:
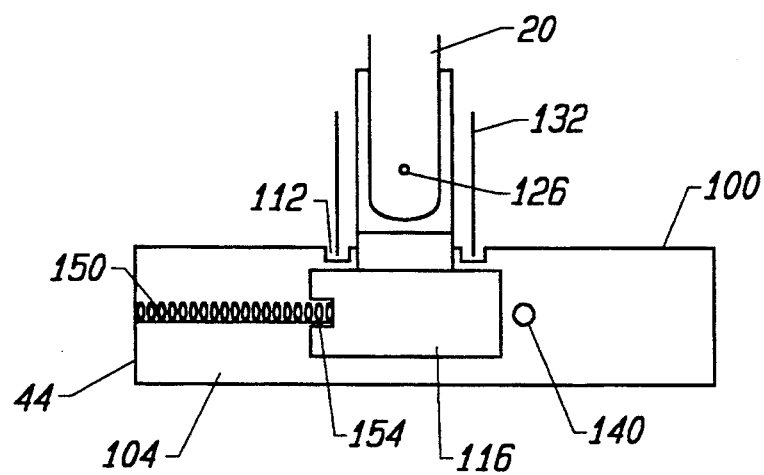
FIG. 5B is a side cross-sectional view of the pump handle showing how the grip, sliding and locking mechanisms, and of the handle, and the shaft fit together.

Turning for the moment to FIGS. 5A and 5B, the assembly of sliding member 114 to grip 100 will be explained. Rectangular body 116 fits inside rectangular cavity 104 of grip 100 and may slide back and forth inside the cavity 104. The elevated portion 118 projects down from rectangular body 116 through slot 106. The two parallel walls 120, 121 are parallel with raised inner walls 108, 109. The end of shaft 20 has a bore 126 through which axle bar 124 passes.

Figure 4C:
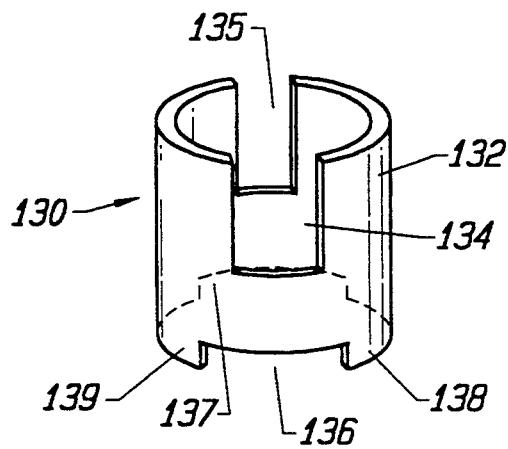
FIG. 4C is a perspective view of the locking mechanism in the handle.

Proceeding to FIG. 4C, the locking mechanism 130 of the handle 100 is shown in a perspective view. Locking mechanism 130 surrounds the end of shaft 20 and parallel walls 120, 121. Locking mechanism 130 is a cylindrical tube 132. A pair of opposing deep grooves 134, 135 cut into top of the tube 132. The width of deep grooves 134, 135 is equal to the diameter of shaft 20. A pair of opposing wide shallow groves 136, 137, are cut into the lower edge of tube 132 to create two opposing flanges 138, 139. The width of the shallow grooves 136, 137 are just larger than the distance between the raised inner walls 108 and 109. Deep groove 134 and shallow groove 136 are cut into the same side of the tube 132, as are deep groove 135 and shallow grove 137.

Figure 6A:
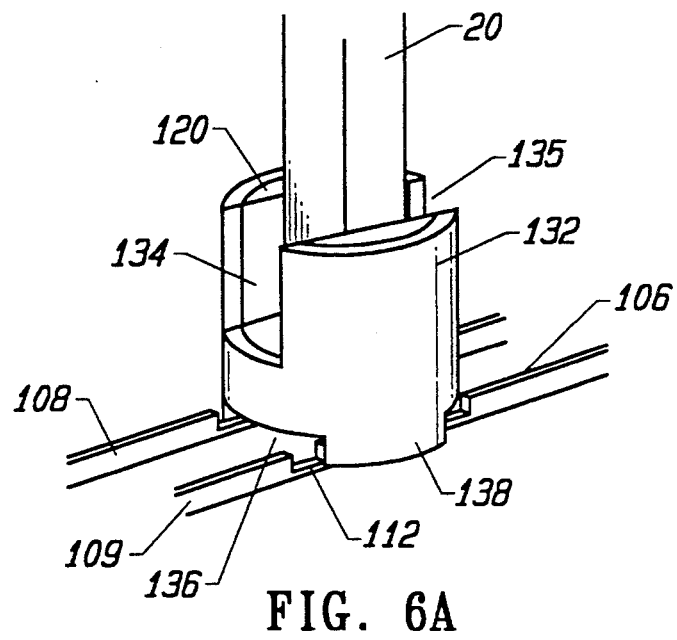
FIG. 6A is a perspective view of the handle of the pump showing the locking mechanism in an unlocked position.
Figure 6B:
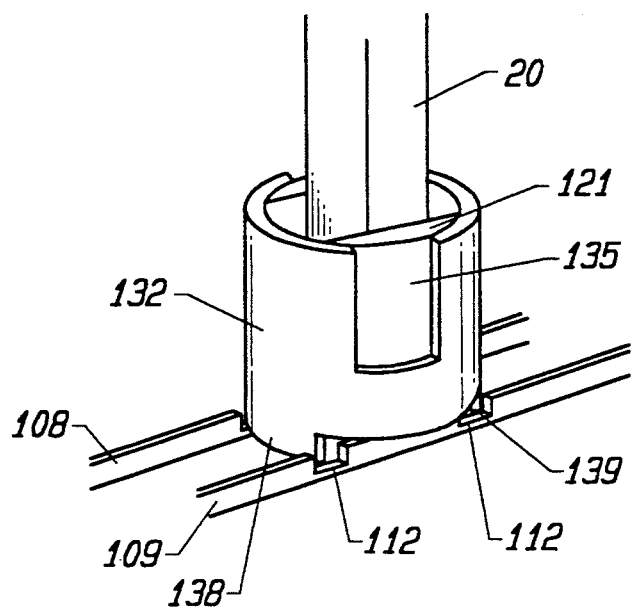
FIG. 6B is a perspective view of the handle of the pump showing the locking mechanism in a locked position.

Turning now to FIGS. 6A and 6B, the locking aspects of the handle 28 will be explained. When tube 132 is located at the center of grip 100, the tube 132 can be rotated because the lower flanges 138, 139 of the tube 132 fit through notches 112. In this location, tube 132 can be rotated between a first locking position and a second sliding position. As shown in FIG. 6B, in the locking position the lower edges of the tube 32 are perpendicular to the raised inner walls 108 and 109, and deep grooves 134, 135 are adjacent parallel walls 120, 121. In this position shaft 20 is held in place by the tube 132 and cannot pivot. Also, the outermost edges of lower flanges 138, 139, while resting in the grooves 112, catch against the raised inner walls 108, 109, thereby preventing the grip 100 from moving relative to shaft 20. As shown in FIG. 6A, in the sliding position the tube 132 is rotated by ninety degrees so that the lower flanges 138, 139 are substantially perpendicular and surround the raised inner walls 108, 109. In this position, the shaft 20 can pivot about axle bar 124 and slide through deep groove 134 or 135. In this position, the raised inner walls 108, 109 slide between the shallow grooves 136, 137, allowing the grip 100 to slide in relation to shaft 20 and rectangular body 116. A blocking bar 140 may be located in rectangular cavity 104 to prevent the rectangular body 116 from sliding past a certain point, preferably a point where the tube 132 is located at the center point of grip 100.

A C-shaped member 144 with a gap 145 may be attached above parallel walls 120, 121 to hold tube 132 in place. C-shaped member 144 would project out beyond parallel walls 120, 121 so that it's outer edge is smooth with the outer surface of tube 132. The C-shaped member can prevent shaft 20 from pivoting in any direction accept that of gap 145. Thus, the C-shaped member prevents the shaft 20 from pivoting through more than ninety degrees.

Referring now to FIG. 5B, the handle 28 may also include a spring 150 to provide a mechanism to fit the pump 10 to the frame of a bike. Rectangular body 116 may have a recess 154 located on the side opposite the blocking bar. One end of spring 150 is attached to the side 44 of rectangular cavity 104 inside grip 100 and the other end of spring 150 is fit inside recess 150. When the handle is parallel to the barrel, the spring 150 forces the outermost end 44 away from the shaft 20 and base 16.

Figure 7:
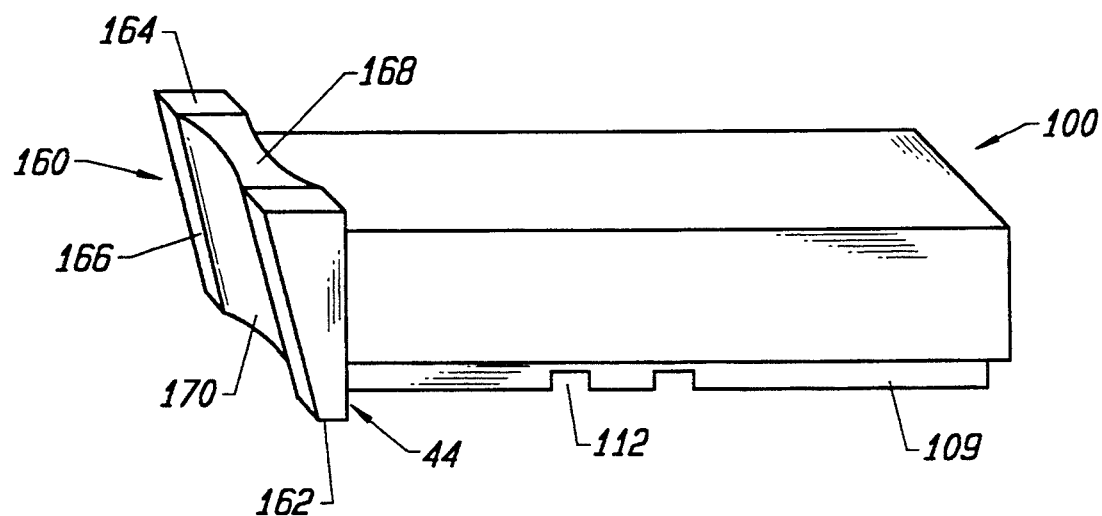
FIG. 7 is a close-up perspective view of one end of the handle of the pump adapted to be fit on a bicycle frame.

The pump of the present invention has a means to be attached to a bicycle frame. In the preferred embodiments shown by FIGS. 3A, 3B and 7, the pump is shaped to fit a bicycle frame. In particular, the handle 28 and base 16 have some means to fit to the tubes of the bicycle frame. Referring now to FIG. 7, a close-up of the grip 100 of handle 28 is shown to explain the adaption of the pump to be fit to a bicycle frame. At the outermost end 44 of grip 100 is wedge 160. Wedge 160 has a narrow bottom surface 162 about ½ inch across, a wide top surface 164 about ⅛ inch across, and a tilted side surface 166. Carved into wide top surface 164 is a shallow horizontal channel 168. Carved into tilted side surface 166 is shallow vertical channel 170. Shallow channels 168 and 170 are both about ⅜ inch deep.

Referring back to FIGS. 3A and 3B, a close-up of the base 18 of main body 14 is shown to explain the adaption of the pump 10 to be fit to a bicycle. On the bottom surface of raised block 80 there is a shallow furrow 174. At the end 45 of block there is a concave depression 176.

Turning back to FIG. 2B, the shallow horizontal channel 168 of wedge 160 and shallow furrow 174 of raised block 80 fit to bar 56, so that the pump 10 can rest below top bar 56. Vertical channel 166 of wedge 160 fits bar 57, whereas concave depression 176 of base 18 fits bar 58. Spring 150 acts to apply pressure and force end 44 outward. The user grasps the pump, pushes the handle downward, and inserts the pump 10 into position on the bicycle frame 50. When the handle 28 is released, vertical channel 166 and concave depression 176 will be forced apart and will engage bars 57 and 58 to firmly hold pump 10 in place on the bicycle frame 50.

Figure 8:
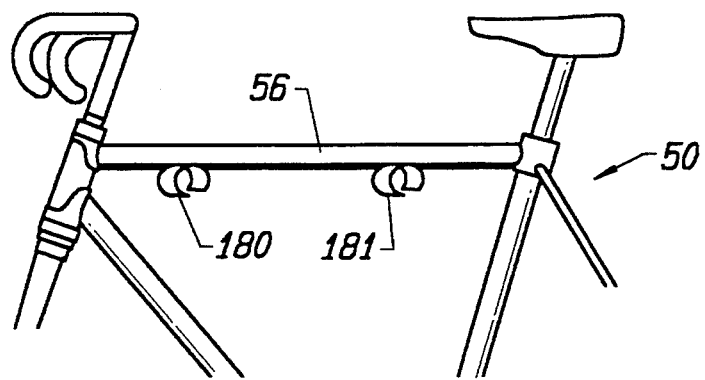
FIG. 8 is a perspective view of the pump with clip-ons.

Referring now to FIG. 8, an alternate embodiment of the pump of the present invention is shown which utilizes clip-ons. As shown in FIG. 8, clip-ons 180, 181 are attached to the bottom of top tube 56 with double-sided stick tape or some other adhesive. Clip-ons 180, 181 are "C"-shaped plastic members. The ends of the "C" are flexible enough to allow user 60 to push barrel 16 into, and pull barrel 16 out of the "C", yet stiff enough that gravity does not simply cause the pump 10 to fall out of the clip-ons 180, 181. If clip-ons 180, 181 are used, the handle 28 and base 18 of the pump 10 need not be specially adapted to fit the bicycle frame 50.

Figure 9:
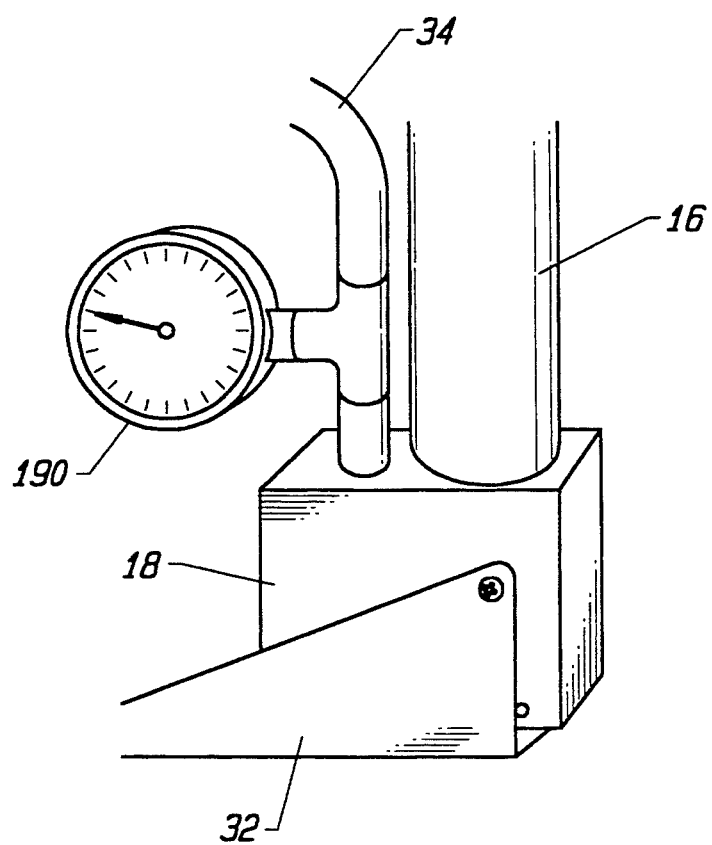
FIG. 9 shows the use of a pressure gage in conjunction with the pump of the present invention.

With reference to FIG. 9, one embodiment of the pump of the present invention is includes a pressure gage. As shown in FIG. 9, pressure gage 190 is attached by means of a T-joint to hose 34. Alternately, gage 190 may be attached directly to base 18 of pump 10. Pressure gage 190 may be any one of a number of commercially available gauges. Pressure gage 190 should be able to determine pressure inside the pump up to approximately 140 to 200 p.s.i. FIG. 9 shows the gage 190 in large detail for clarity. Preferably gage 190 is very small and light-weight.

Although the presently preferred embodiment of the invention has been illustrated and discussed herein, it is contemplated that various changes and modifications will be immediately apparent to those skilled in the art. For example, the pump is applicable to compression of gases other than air, such as propane, nitrogen, oxygen, helium, etc. Clearly, minor changes may be made in the form and construction of the particular embodiments without departing from the material spirit of the invention. Accordingly, it is intended that the description should not be deemed limiting the invention, the scope of which is particularly specified and pointed out by the following claims.

What is claimed is:

1. A bicycle pump for attachment to a bicycle frame, said frame having a horizontal tube and two non-horizontal tubes, said pump comprising:
   (a) a main body including,
      (1) a barrel having a top and a bottom,
      (2) a base connected to the bottom of said barrel,
      (3) a first cylindrical indentation connected to said main body adapted to fit said horizontal tube, and
      (4) a second cylindrical indentation located on said base adapted to fit one of said two non-horizontal tubes;
   (b) a shaft having a top and a bottom, the bottom of said shaft inserted into the top of said barrel;
   (c) a handle pivotally attached to the top of said shaft and moveable between a first position perpendicular to said shaft and a second position parallel to said shaft, said handle including
      (1) spring means located inside said handle for forcing an outer end of said handle away from the top of said shaft, and
      (2) a third cylindrical indentation adapted to fit another one of said two non-horizontal tubes located at the outermost end of said handle;
   (d) a hose connected to said base;
   (e) means for forcing air through said hose as said shaft
   slides in said barrel; and
   a footpeg pivotally attached to said main body.

2. The bicycle pump of claim 1 wherein
(a) said handle further includes
   (1) a grip, and
   (2) a slidable member inside said grip, said shaft connected to said slidable member, and
(b) said spring means is a spring located inside said grip and bearing against said outer end of the handle and said slidable member.

3. The bicycle pump of claim 1 wherein said main body includes a protruding block and said first cylindrical indentation is located in said protruding block.

4. The bicycle pump of claim 1 wherein said handle includes a fourth cylindrical indentation adapted to fit said horizontal tube.

5. The bicycle pump of claim 1 further comprising blocking means for limiting the pivoting of said footpeg to ninety degrees.

6. The bicycle pump of claim 5 further comprising means for holding said footpeg in said first position.

7. The bicycle pump of claim 1 wherein said footpeg includes a an elongated flat strut suitable for being stepped upon by a foot of the user.

8. The bicycle pump of claim 7 wherein said footpeg further includes two parallel plates attached to the sides of the flat strut, said two parallel plates pivotally attached to opposite sides of said base.

9. The bicycle pump of claim 8 wherein said base further includes at least one protruding bump, at least one of said two parallel plates contacting said at least one protruding bump to block said footpeg from rotating more than ninety degrees.

10. The bicycle pump of claim 9 further comprising a Velcro strap attached to said barrel and having a length sufficient to wrap around said barrel and footpeg.

11. A bicycle pump comprising:
a main body including a barrel and a base, said barrel having a top and a bottom, said base connected to the bottom of said barrel;
a shaft having a top and a bottom, the bottom of said shaft inserted into the top of said barrel, the top of said shaft having a bore;
a handle attached to the top of said shaft, said handle including
   (a) a rectangular grip enclosing an elongated cavity therein and having a slot located on an underside of said grip and accessing said elongated cavity,
   (b) a slidable member having
      (1) an elongated rectangular body with a length less than a length of the rectangular cavity, said body fitting inside said cavity and slidable within said cavity, and
      (2) two parallel walls attached to said body and projecting downward from said slot, and
   (c) an axle bar connecting said two parallel walls, said axle bar passing through said bore to pivotally attach said handle to said shaft;
a hose connected to said base;
means for forcing air through said hose as said shaft slides in said barrel;
means for securing the pump in a stable position against the ground as a user moves said handle; and
means for attaching the pump to a frame of a bicycle.

12. The bicycle pump of claim 11 wherein said handle further includes a C-shaped member attached to said two parallel walls, said C-shaped member having a gap through which said shaft may pivot, said C-shaped member limiting said handle from pivoting more than ninety degrees.

13. The bicycle pump of claim 12 wherein said body has a recess and said handle further includes a spring having an end contacting an outermost end of said grip and another end inserted into said recess, said spring forcing said outermost end away from the top of said shaft.

14. The bicycle pump of claim 13 wherein said base has a protruding block with a furrow and an edge with a depression.

15. The bicycle pump of claim 14 wherein said handle further includes a wedge attached to said outermost edge, said wedge having a vertical notch and a horizontal notch.

16. The bicycle pump of claim 15 wherein the frame has a plurality of tubes including first, second and third tubes, said furrow and said horizontal notch engaging said first tube, said vertical notch engaging said second tube, and said depression engaging said third tube, said spring holding said wedge and base in tension against said plurality of tubes of said bicycle frame, whereby the pump is attached to the frame.

* * * * *